UNITED STATES PATENT OFFICE.

FRIEDRICH STOLZ, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

ALKYLAMINOACETOPYROCATECHOL AND PROCESS OF MAKING SAME.

No. 815,653. Specification of Letters Patent. Patented March 20, 1906.

Application filed August 31, 1904. Serial No. 222,838.

*To all whom it may concern:*

Be it known that I, FRIEDRICH STOLZ, Ph. D., chemist, a citizen of the Empire of Germany, residing at Höchst-on-the-Main, Germany, have invented certain new and useful Improvements in the Manufacture of Alkylaminoacetopyrocatechol, of which the following is a specification.

I have found that chloro-acetopyrocatechol combines not only with primary aliphatic amin to salts, as shown by Dzierzgowski, (*Bull. d. la Soc. Chim.* 1894, Vol. XII, page 907,) but that on allowing the chloro-acetopyrocatechol with an excess of the amin to stand for a considerable time, or on gently heating both, an exchange of the halogen atom for the amin residue occurs. Thus alkylaminoacetopyrocatechols are obtained, which are of great value in therapeutics, as their therapeutic effect is similar to that of adrenaline. They are also administered in the same manner as the said product.

The process may be carried out, for instance, as follows:

Example: One part, by weight, of finely-pulverized chloro-acetopyrocatechol obtained by the interaction of chloro-acetyl chlorid and pyrocatechol (*J. Russ. Phys. Chim. Ges.* 25, 154) is suspended in the same quantity of alcohol, to which is gradually added one part, by weight, of an aqueous solution of sixty per cent. of monomethylamin. The methylamin salt of the chlorinated dioxyketone is first formed without any solution occurring. After some time, but more rapidly when gently heated, a further reaction occurs, the salt being transformed into the methylaminacetopyrocatechol, which separates as a crystalline precipitate. To complete the transformation, the whole is allowed to stand for some time, whereupon the separated product is filtered and subsequently washed with alcohol. The compound may be purified by dissolving it in dilute hydrochloric acid, and on carefully adding ammonia small traces of impurities are precipitated. A further addition of ammonia separates the methylaminketone.

The methylaminacetopyrocatechol is a white crystalline powder, very little soluble in water, alcohol, or ether. It decomposes when heated to 230° centigrade, assuming previously a dark color. With hydrochloric acid it yields a salt readily soluble in water. It crystallizes from alcohol in colorless crystals. The aqueous solution, like pyrocatechol with ferric chlorid, yields an emerald-green coloration.

Like methylamin, other primary aliphatic amins, such as ethylamin, may be combined with chloroacetopyrocatechol.

The properties of the compounds thus obtainable correspond with those of methylaminacetopyrocatechol.

Having now described my invention, what I claim is—

1. The process herein described for the manufacture of alkylaminoacetopyrocatechol, which consists in substituting for the halogen of chloroacetopyrocatechol the radical of a primary aliphatic amin by allowing the chloroacetopyrocatechol to digest with primary aliphatic amins.

2. The process herein described for the manufacture of alkylaminoacetopyrocatechol, which consists in substituting for the halogen of chloroacetopyrocatechol the radical of a primary aliphatic amin by gently heating the chloroacetopyrocatechol with primary aliphatic amins.

3. As new products, the alkylaminoacetopyrocatechols, being white crystalline compounds, very little soluble in water, alcohol and ether, melting at a high temperature with decomposition, forming with hydrochloric acid salts readily soluble in water, crystallizing from alcohol, the aqueous solution of the salt yielding with ferric chlorid an emerald-green coloration; ammonia precipitating from the solution the aminoketone.

In testimony that I claim the foregoing as my invention I have signed my name in presence of two subscribing witnesses.

FRIEDRICH STOLZ.

Witnesses:
ALFRED BRISBOIS,
BERNHARD LEYDECKER.